S. C. LINBARGER.
CERAMIC ARTICLE.
APPLICATION FILED JAN. 25, 1918.

1,336,751.

Patented Apr. 13, 1920.

*Fig. 1.*

UNITED STATES PATENT OFFICE.

SILAS C. LINBARGER, OF NIAGARA FALLS, NEW YORK, ASSIGNOR TO THE CARBORUNDUM COMPANY, OF NIAGARA FALLS, NEW YORK, A CORPORATION OF PENNSYLVANIA.

CERAMIC ARTICLE.

1,336,751.  Specification of Letters Patent.  Patented Apr. 13, 1920.

Application filed January 25, 1918. Serial No. 213,719.

*To all whom it may concern:*

Be it known that I, SILAS C. LINBARGER, residing at Niagara Falls, in the county of Niagara and State of New York, have invented a new and useful Improvement in Ceramic Articles, of which the following is a full, clear, and exact description, reference being had to the accompanying drawings, in which—

Figure 1 is a plan view of an abrasive wheel embodying my invention; and Fig. 2 is a transverse section thereof.

My invention has relation to the manufacture of certain ceramic articles, and is designed to provide an article having a structure such as to materially reduce or avoid the losses due to cracking or breaking of the article.

My invention is applicable to a variety of ceramic articles. A typical instance is that of grinding wheels composed of abrasive materials or graded abrasive grains of any kind, which are bonded together with a binder of clays, silicate of soda, or organic bonding material. In the manufacture of such grinding wheels after the abrasive and bonding materials are mixed together, formed into a wheel and dried and burned or baked in an oven or kiln, there are apt to be large losses due to radial cracks which emanate from the central arbor hole. I have found that this cracking can be largely overcome by making that portion of the wheel adjacent to and around the arbor hole of a structure which is of less density than that of the remaining portion of the wheel. In this manner, such wheels, as well as other ceramic articles, and particularly wheels having a cutting portion of relatively fine grains and relatively great density, may be made without the loss above described.

In carrying out my invention, abrasive wheels of the ceramic bond or vitrified type made by the pressed process are constructed as follows:

Abrasive material, such as carborundum in grain form of relatively coarse grade, is mixed with a small amount, usually from about seven to sixteen per cent. or somewhat more, of a suitable bonding material, such as a mixture of three parts kaolin and seven parts feldspar. The mixture is then brought to the usual molding consistency by the addition of the proper amount of water.

A relatively small ring of this material is then formed by tamping it around the arbor pin of the mold, the size of this pin being approximately the size of the arbor hole in the finished wheel. The thickness of the ring is preferably the same as the thickness of the wheel which is to be made, and its diameter will vary with the size of the finished grinding wheel. I have found that a ring of this material, the diameter of which is two inches or more in excess of the diameter of the arbor hole, gives satisfactory results. The periphery of the ring so formed is then roughened up by a sharp pointed tool or in any other suitable manner. The remainder of the mold is then filled with a proper bond and abrasive grain mixture to give a cutting wheel of the desired properties. The whole is then subjected to pressure. The wheels are then removed from the mold and allowed to dry, after which they are fired in the kiln in the usual manner.

The resulting article is an abrasive wheel such for instance, as shown in Figs. 1 and 2 of the drawings having a central ring portion 2 around its arbor hole 3 of relatively coarse grained porous material, this ring being firmly fused to the surrounding ring 4 of denser vitrified material with the proper combination of grit and bond to give the desired cutting properties to the wheel.

The bonding material used in this center ring should be of such a character that it will mature at approximately the same temperature as the bond in the cutting portion of the wheel. Furthermore, the bonding material in the two portions of the wheel should preferably be so related chemically and physically that the two portions will adhere to each other without impairing the strength of the finished article. It has been found that in most cases the same bond can be used in the coarse center as is used in the remainder of the wheel, the difference in density of the two portions being attained by using a greater percentage of coarser grains in the center portion.

It will be understood that the preceding example is given by way of illustration only and that many modifications may be made within the scope of the appended claims. For example, any suitable bonding material may be incorporated in the main body of the wheel or in the portion around the arbor hole, so long as the necessary condition is present that there is an adhesive and homogeneous union between the two portions of the wheel. Modifications can also be made in the character of the grains used. For example, the grain in the cutting portion of the wheel may be silicon carbid, while the grain in the portion adjacent to the arbor hole may be of a material which has no abrasive properties, such as highly refractory grog or other refractory material, which is capable of giving a proper backing to the bonding material to thereby lower the density to an extent to permit wheels to be manufactured without radial cracks developing around the arbor hole in the drying and baking or burning process.

Among the many ceramic articles of refractory type to which my invention is applicable are muffle supports, irregular shaped tank blocks, glass tanks and refractory articles which have irregular indentations or a round or square hole traversing one or more dimensions of the piece. All such articles made in accordance with my invention will have portions of different densities, or the density may be gradually varied from being very coarse and porous at the points which are subject to cracking to the desired density of the main body of the piece.

I claim:

1. As a new article of manufacture, a circular ceramic abrasive wheel having an arbor hole therethrough and having the body of the wheel immediately surrounding the arbor hole of a lesser density than the outer working portion of the wheel and integrally united therewith, substantially as described.

2. As a new article of manufacture, a circular ceramic abrasive wheel having an arbor hole therethrough and having the portion immediately surrounding the arbor hole composed of relatively coarse refractory grains and a bonding material, and having the working portion of the wheel composed of relatively fine refractory abrasive grains and a bonding material, the two portions of the wheel being integrally united by their bonding materials, substantially as described.

In testimony whereof I have hereunto set my hand.

SILAS C. LINBARGER.